(12) United States Patent
Lah

(10) Patent No.: US 7,357,848 B2
(45) Date of Patent: *Apr. 15, 2008

(54) DEHEADER VALVE INSTALLATION SYSTEM AND METHOD

(75) Inventor: Ruben F. Lah, West Jordan, UT (US)

(73) Assignee: Curtiss-Wright Flow Control Corporation, Falls Church, VA (US)

( * ) Notice: Subject to any disclaimer, the term of this patent is extended or adjusted under 35 U.S.C. 154(b) by 567 days.

This patent is subject to a terminal disclaimer.

(21) Appl. No.: 10/997,034

(22) Filed: Nov. 24, 2004

(65) Prior Publication Data

US 2005/0189208 A1  Sep. 1, 2005

Related U.S. Application Data

(60) Provisional application No. 60/527,937, filed on Dec. 8, 2003.

(51) Int. Cl.
C10B 25/00  (2006.01)

(52) U.S. Cl. ............... 202/242; 202/244; 202/245; 202/262

(58) Field of Classification Search ........ 202/245, 202/242, 244, 262; 201/28
See application file for complete search history.

(56) References Cited

U.S. PATENT DOCUMENTS

| | | | |
|---|---|---|---|
| 4,726,109 A | 2/1988 | Malsbury et al. | 29/402.08 |
| 4,960,358 A | 10/1990 | DiGiacomo et al. | 414/684.3 |
| 5,098,524 A | 3/1992 | Antalfy et al. | 202/96 |
| 5,500,094 A | 3/1996 | Fruchtbaum | 202/241 |
| 5,581,864 A | 12/1996 | Rabet | 29/426.3 |
| 6,565,714 B2* | 5/2003 | Lah | 202/245 |
| 6,660,131 B2* | 12/2003 | Lah | 202/245 |
| 6,843,889 B2* | 1/2005 | Lah et al. | 202/245 |
| 6,964,727 B2* | 11/2005 | Lah | 202/244 |

* cited by examiner

*Primary Examiner*—N. Bhat
(74) *Attorney, Agent, or Firm*—Kirton & McConkie; Michael F. Krieger

(57) ABSTRACT

The present invention features an installation system for facilitating the installation and removal of a closure onto and from a pressure vessel, respectively. The installation system comprises a fixed support structure constructed proximate a pressure vessel; a carriage dynamically and continuously supported by the fixed support structure, wherein the carriage also dynamically and adjustably supports a closure, such as a header or a deheader valve, in a continuous manner; an elevation adjustment assembly allowing the carriage and the closure to move in a vertical manner relative to the fixed support structure and the pressure vessel; and a horizontal transfer assembly that dynamically couples the closure to the carriage to enable horizontal, bidirectional transitioning of the closure relative to the carriage. The elevation adjustment assembly and the horizontal transfer assembly work in harmony together to provide both approximate and precision vector positioning of the closure to enable parallel and concentric alignment with the pressure vessel. In this manner, the closure may be installed and removed from the pressure vessel in a much safer and more efficient manner.

54 Claims, 5 Drawing Sheets

DEHEADER VALVE INSTALLATION SYSTEM AND METHOD

RELATED APPLICATIONS

This application claims priority to U.S. patent application Ser. No. 60/527,937 filed Dec. 8, 2003, entitled "Deheader Valve Installation System and Method."

BACKGROUND

1. Field of the Invention

The present invention relates to deheader valves as designed for connection to corresponding pressure vessels within high temperature, high pressure environments, and more particularly to methods and systems for installing a deheader valve onto or removing a deheader valve from a pressure vessel, such as a coke drum or intermediate spool, operable within a delayed coking system.

2. Background of the Invention and Related Art

In the hydrocarbon processing industry, many refineries recover valuable products from the heavy residual oil that remains after refining operations are completed. This recovery process is known as delayed coking and produces valuable distillates and coke in large vessels or coke drums. Coke drums are usually in operation in pairs so that when one coke drum is being filled with the byproduct or residual material, the feed may be directed to an empty drum so that the filled drum may be cooled and the byproduct purged from the coke drum, a process known as decoking. This allows the refinery process to operate in a continuous manner, without undue interruption.

When one coke drum is full, it must be purged of the byproduct fed into it. The drum is steam purged and cooled with quench water. The drum is then drained of water and vented to atmospheric pressure, after which the top and bottom heads are removed (i.e. the coke drum is de-headed) to allow the coke to be cut from the drum and fall into a catch basin, typically a rail car. This process of de-heading the coke drum can be extremely dangerous for several reasons. To mention only a few, the cooling water introduced into the hot drums prior to the removal of the bottom head becomes extremely hot and could leak from the loosened head and scald surrounding operators, the load of un-drained water and loose coke within the drum may exceed the limits of the support system and cause heavy equipment to fall, positioning the chute and necessary removal of the flanges or heads is done with operators who are in close proximity to the drums, potentially falling coke may injure workers as the heads are removed, and operating personnel may be exposed to finely divided coke particles, steam, hot water and noxious gases, when the drum is opened. Indeed several fatalities occur each year as a result of this manufacturing process. Once the coke is removed, the heads are replaced and the coke drum is prepared to repeat the cycle.

Prior art systems and methods have tired to more efficiently and effectively de-head coke drums, as well as to minimize many of the dangers inherent is the de-heading process. One such method involves placing a de-heading cart under the drum, raising a flange support ram, with braces installed, and loosening some (up to one half) of the flange bolts by manual operation with an impact wrench. Following the water quench and drain, the remaining bolts are manually removed, braces are removed from the ram, the approximately 4-ton flange is lowered, and the cart, with flange resting thereon, is moved away. This is extremely dangerous due to the manual labor requirements.

Other systems have been disclosed, which somewhat reduce human or manual involvement. For example, U.S. Pat. No. 4,726,109 to Malsbury et al. and U.S. Pat. No. 4,960,358 to DiGiacomo et al. describe a remote unheading device for coking drums. The device includes a head unit for attachment to a lower flange of a coking drum and a plurality of swing bolts which are disconnected by remotely operated de-tensioning equipment. A platform device lowers the head unit, moves it laterally to one side and tips it for cleaning. A chute attached to the frame can be raised into engagement with the coking drum lower flange for removal of coke from the drum.

U.S. Pat. No. 5,098,524 to Antalfy et al. filed on Dec. 10, 1990 discloses a coke drum unheading device having a pivoting actuator system operable from a location remote from a drum outlet. The actuator is adapted to move a drum head between closed and open positions and to retain the drum head in a closed position under a load.

U.S. Pat. No. 5,500,094 to Fruchtbaum provides a coke drum unheading device that retracts and tilts the bottom head incrementally so that falling debris such as shot coke can be caught by a chute. Following disposal of the loose debris, the head can be withdrawn from the area of the drum for maintenance. Specifically, the invention provides an unheading device for removing a bottom head from a flange on a lower end of a coke drum. An unheading car is horizontally movable into and from position below the bottom head. A vertically adjustable bottom head support member is mounted on the car. A bearing plate is pivotally mounted at an upper end of the support member for engaging a lower surface of the bottom head. A retractable arm has first and second sections hingedly connected at one end and having respective opposite ends secured to the bearing plate and the support member for pivoting the bearing plate and bottom head supported thereon with respect to horizontal, preferably to tilt the head towards an adjacent chute.

U.S. Pat. No. 5,581,864 to Rabet discloses an apparatus and method enabling removal of the drum head of a coke drum, which comprises an apparatus remotely placing a carriage under the drum head and the carriage is adapted to remotely engage the drum head, tightly support the head against the drum while workers are in the area, and to lower the head and carry it away. A safety feature is also included and disclosed, wherein the carriage is normally supported by springs which, in the event of excessive loads, automatically transfers the load carrier to an overhead beam designed to carry any excessive loads.

Each of these prior art devices share common deficiencies in that they are incapable of providing simple, efficient, and safe solutions to the de-heading of a coke drum. Specifically, each of the assemblies or devices require that the head unit be completely removed from the flange portion of the coke drum after each coking cycle and prior to the purging of the coke from the coke drum. This creates an extreme hazard to workers and provides an inefficient and time consuming procedure. Removal of the head unit increases the chance for accident, while at the same time increases human involvement as the head unit must be properly placed on the coke drum each time despite the automation involved. In addition, a large amount of floor space is required to accommodate those assemblies and devices that automate the removal and lifting of the head unit from the coke drum. Finally, such devices and systems may not be operable in an environment where there the bottom headroom is less than the diameter of the bottom head.

As with every industry in the modern world, advances in technology are made for several reasons, some of which include safety, reliability, economy, ease of operation and maintenance, utility, and other beneficial areas. If advancement of a technology provides improvements in any of the above categories it has true value. Generally speaking, advances in Coker technology have come gradually as competing companies have built upon existing technologies or operational methods by making improvements and modifications to base designs or concepts. Through this process, some technologies utilized in the Delayed Coking industry have become optimized, meaning that we have maximized the benefits that can be derived from them.

The general trends in the Delayed Coking industry is towards increased safety and reliability. It goes without saying that improved economy, utility, and ease of maintenance would be added and welcomed benefits of any innovation that effectively satisfies the first two requirements. It is for the case of safety that many owners and operators of Coker units are thinking forward to the time when total automation of a Coker Unit becomes a possibility and a reality. Obviously, there are many technical challenges associated with accomplishing this goal. Presently, one of the major roadblocks of the total automation concept is the coke drum unheading methods used. Whether drum unheading is done manually, or by any one of the above discussed prior art systems and devices that are currently available, there is a significant hands on component required in the process. As is well known in the industry, the hands on component of unheading always was, and remains today, very hazardous for operating personnel.

SUMMARY AND OBJECTS OF THE INVENTION

As discussed above, prior systems and methods for installing and removing a header from a pressure vessel are replete with deficiencies or inadequacies, such that there is a need for a safer, more efficient method of installing headers and other devices, such as a deheader valve, onto a pressure vessel.

Therefore, it is an object of some embodiments of the present invention to provide a valve installation system for safely and efficiently installing and removing a deheader valve onto and from a pressure vessel, respectively, in a much more simplified manner.

It is another object of some embodiments of the present invention to provide an installation system for safely and efficiently installing and removing a closure (e.g. a header or a deheader valve) onto and from a pressure vessel, respectively.

It is still another object of some embodiments of the present invention to provide both approximate and precision manipulation and adjustment of a closure with respect to a pressure vessel during installation and removal of the closure.

It is a further object of some embodiments of the present invention to provide continued support of a closure during installation onto and removal from a pressure vessel.

It is a further object of some embodiments of the present invention to provide an installation system that facilitates continuous, supported, and multi-vector manipulation of a deheader valve or other closure during installation onto a pressure vessel, as well as during removal from a pressure vessel.

It is still a further object of some embodiments of the present invention to increase the efficiency and safety of installing and removing a closure onto and from a pressure vessel, respectively.

It is still a further object of some embodiments of the present invention to improve the overall efficiency and safety of a system operating within a high temperature, high pressure environment, such as a delayed coking system and process.

In accordance with the invention as embodied and broadly described herein, the present invention features a dynamic deheader valve installation system comprising means for continuously supporting a deheader valve during installation onto and removal from a pressure vessel; means for vertically positioning the deheader valve to enable and ensure parallel alignment with the pressure vessel; and means for horizontally positioning the deheader valve along the means for supporting a deheader valve to enable and ensure concentric alignment of the deheader valve with the pressure vessel, wherein each of the means described effectively function together in a symbiotic relationship to provide continuous, supported, multi-vector manipulation of said deheader valve with respect to the pressure vessel. The installation system further comprises a fixed support structure proximate the pressure vessel that supports each means described above.

In one exemplary embodiment, means for continuously supporting a deheader valve comprises a valve carriage having first and second side rails connected by a plurality of cross supports.

Means for vertically positioning the deheader valve comprises an elevation assembly coupled to means for supporting a deheader valve (valve carriage), wherein the elevation assembly enables independent, multiple-point height adjustment and alignment of the deheader valve with respect to the pressure vessel. In one exemplary embodiment, elevation assembly comprises adjustable biasing members located at opposing ends of the valve carriage.

Means for horizontally positioning the deheader valve comprises a horizontal transfer assembly dynamically coupling the deheader valve and means for supporting a deheader valve (valve carriage) together, such that the horizontal transfer assembly facilitates bi-directional horizontal transitioning of the deheader valve. In one exemplary embodiment, lateral assembly comprises a roller assembly having a plurality of rollers attached to said deheader valve via axles, and wherein the rollers are designed to slide along the valve carriage.

More specifically, the present invention features a dynamic deheader valve installation system comprising a fixed support structure constructed proximate a pressure vessel, such as a coke drum or a transition spool; a valve carriage dynamically supported by the fixed support structure, wherein the valve carriage also dynamically and adjustably supports a deheader valve that releasably couples to the pressure vessel, and wherein the movement of the valve carriage and the deheader valve are independent of one another; an elevation adjustment assembly dynamically suspending the valve carriage from the fixed support structure to allow the valve carriage to move relative to the fixed support structure, the elevation assembly enabling vertical positioning and adjustment of the valve carriage and the deheader valve; and a horizontal transfer assembly that dynamically couples the deheader valve to the valve carriage, wherein the horizontal transfer assembly enables horizontal bi-directional transitioning of the deheader valve relative to the valve carriage, the elevation adjustment assembly and the horizontal transfer assembly providing both approximate and precision vector positioning of the deheader valve to enable parallel and concentric alignment of an opening in the deheader valve with a complimentary opening in the pressure vessel.

The present invention further comprises an installation system similar to the one discussed above, except that instead of facilitating installation and removal of a deheader valve, the assembly facilitates installation and removal of a prior art header. Other closures known by those skilled in the art are also intended to come within the scope of the present invention as described and claimed herein.

Finally, the present invention features a method for providing continued support of a closure, and particularly a deheader valve, during installation onto and removal from a pressure vessel.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
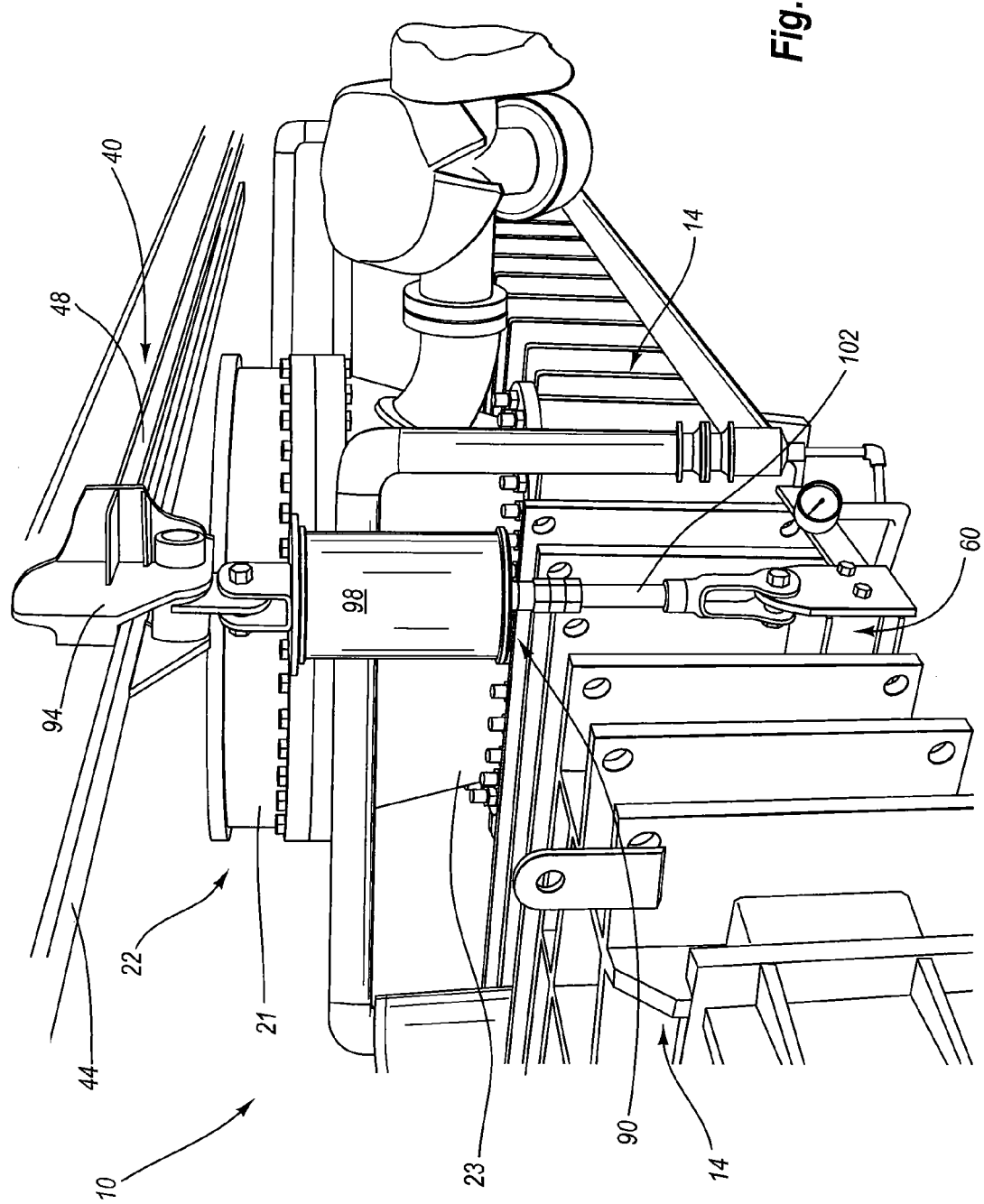
FIG. 1 illustrates one exemplary embodiment of the valve installation system with the girders of the fixed support structure parallel with the valve carriage, and wherein the installation system is operational within a delayed coking system.

It will be readily understood that the components of the present invention, as generally described and illustrated in the figures herein, could be arranged and designed in a wide variety of different configurations. Thus, the following more detailed description of the embodiments of the system and method of the present invention, and represented in FIGS. 1 through 5, is not intended to limit the scope of the invention, as claimed, but is merely representative of the presently preferred embodiments of the invention.

The presently preferred embodiments of the invention will be best understood by reference to the drawings wherein like parts are designated by like numerals throughout.

The present invention describes a method and system for supporting a deheader valve during installation onto a pressure vessel, and also when the deheader valve is decoupled from the pressure vessel for maintenance or other purposes. For clarification and ease of reading, the following more detailed description is divided into several sections.

General Discussion Pertaining to Delayed Coking and Coke Drum De-Heading

In the typical delayed coking process, high boiling petroleum residues are fed to one or more coke drums where they are thermally cracked into light products and a solid residue—petroleum coke. The coke drums are typically large cylindrical vessels having a top head and a conical bottom portion fitted with a bottom head. The fundamental goal of coking is the thermal cracking of very high boiling point petroleum residues into lighter fuel fractions. Coke is a byproduct of the process. Delayed coking is an endothermic reaction with a furnace supplying the necessary heat to complete the coking reaction in a drum. The exact mechanism is very complex, and out of all the reactions that occur, only three distinct steps have been isolated: 1) partial vaporization and mild coking of the feed as it passes through the furnace; 2) cracking of the vapor as it passes through the coke drum; and 3) cracking and polymerization of the heavy liquid trapped in the drum until it is converted to vapor and coke. The process is extremely temperature-sensitive with the varying temperatures producing varying types of coke. For example, if the temperature is too low, the coking reaction does not proceed far enough and pitch or soft coke formation occurs. If the temperature is too high, the coke formed generally is very hard and difficult to remove from the drum with hydraulic decoking equipment. Higher temperatures also increase the risk of coking in the furnace tubes or the transfer line. As stated, delayed coking is a thermal cracking process used in petroleum refineries to upgrade and convert petroleum residuum (or resid) into liquid and gas product streams leaving behind a solid concentrated carbon material, or coke. A fired heater is used in the process to reach thermal cracking temperatures, which range upwards of 1,0000° F. With short residence time in the furnace, coking of the feed material is thereby "delayed" until it reaches large coking drums downstream of the heater. In normal operations, there are two coke drums so that when one is being filled, the other may be purged of the manufactured coke. These coke drums are large structures that are approximately 25-30 meters in height and from 4 to 9 meters in diameter. They are equipped with a top blind flange closure or orifice that is typically about 1.5 meters in diameter, and a bottom blind flange orifice that is typically about 2 meters in diameter.

In a typical petroleum refinery process, several different physical structures of petroleum coke may be produced. These are namely, shot coke, sponge coke, and/or needle coke, and are each distinguished by their physical structures and chemical properties. These physical structures and chemical properties also serve to determine the end use of the material. Several uses are available for manufactured coke, some of which include fuel for burning, the ability to be calcined for use in the aluminum, chemical, or steel industries, or the ability to be gasified to produce steam, electricity, or gas feedstock for the petrochemicals industry.

To produce the coke, a delayed coker feed originates from the crude oil supplied to the refinery and travels through a series of process members and finally empties into one of the coke drums used to manufacture coke. The delayed coking process is a batch-continuous process, which means that the process is ongoing or continuous as the feed stream coming from the furnace alternates filling between the two or more coke drums. As mentioned, while one drum is on-line filling up with coke, the other is being stripped, cooled, decoked, and prepared to receive another batch. This is a timely process, with each batch in the batch-continuous process taking approximately 12-20 hours to complete. In essence, hot oil, or resid as it is commonly referred to as, from the tube furnace is fed into one of the coke drums in the system. The oil is extremely hot and produces hot vapors that condense on the colder walls of the coke drum. As the drum is being filled, a large amount of liquid runs down the sides of the drum into a boiling turbulent pool at the bottom. As this process continues, the hot resid and the condensing vapors cause the coke drum walls to heat. This naturally in turn, causes the resid to produce less and less of the condensing vapors, which ultimately causes the liquid at the bottom of the coke drum to start to heat up to coking temperatures. After some time, a main channel is formed in the coke drum, and as time goes on, the liquid above the accumulated coke decreases and the liquid turns to a more viscous type tar. This tar keeps trying to run back down the main channel which can coke at the top, thus causing the channel to branch. This process progresses up through the coke drum until the drum is full, wherein the liquid pools slowly turn to solid coke. When the first coke drum is full, the hot oil feed is switched to the second coke drum, and the first coke drum is isolated, steamed to remove residual hydrocarbons, cooled by filling with water, opened, and then decoked. This cyclical process is repeated over and over again in the manufacture of coke.

The decoking process is the process used to remove the coke from the drum upon completion of the coking process. Due to the shape and orientation of the coke drum, coke accumulates in the area near its bottom opening. To remove the coke, both the top and the bottom of the coke drum is opened. Typically, once full, the drum is vented to atmospheric pressure and the top head (typically a 4-foot diameter flange) is unbolted and removed to enable placement of a hydraulic coke cutting apparatus. After the cooling water is drained from the vessel, the bottom of the vessel must also be opened. For prior art systems using a similar head bolted onto the bottom of the coke drum, the decoking process, and particularly the "deheading" process, can be very dangerous because of the size of the flanges, the high temperatures within the drum, potential falling coke, and other reasons as mentioned above. As such, deheader valves have been designed to improve the "deheading" process, as well as to automate the process and make it much more efficient. An exemplary deheader valve is described below.

Once the bottom of the coke drum is opened, the coke is removed from the drum by drilling a pilot hole from top to bottom of the coke bed using high pressure water jets. Following this, the main body of coke left in the coke drum is cut into fragments which fall out the bottom and into a collection bin, such as a bin on a rail cart, etc. The coke is then dewatered, crushed and sent to coke storage or loading facilities.

Design and Function of Deheader Valves

Although the following deheading system may be applicable to both top and bottom de-heading systems, or rather the de-heading system may be applicable and utilized on both the top and bottom openings of a coke drum, only a bottom de-heading system will be described. One ordinarily skilled in the art will recognize that the deheader valve as explained and described herein for a coke drum bottom de-heading system may also be designed and used as a coke drum top de-heading system. Thus, the following discussion pertaining to the bottom de-heading system and is not meant to be limiting to such.

Prior to reciting the specifics of the deheader valve, it should be noted that the deheader valve of the present invention and system it is used within, is designed having, or possessing, significant functional, utility, and safety advantages over using other deheading systems. First, the system is capable of repeated and automatic unheading (or de-heading) and re-heading of a coke drum without any manned activity at or nearby the coke drum. Thus, safety and efficiency are both dramatically increased. Second, the system reduces the total de-heading and re-heading time. For example, some embodiments of the present invention reduce the total deheading and re-heading to less than 10 minutes. Such a time is a dramatic improvement over the times of prior art de-heading systems. Third, the system may be permanently attached directly to the coke drum flange or to a transition spool above the device and to a stationary coke chute below the device, which chute discharges directly into the pit or into rail cars. Fourth, the system has the flexibility to allow safe drainage of coke and drum water through its outlet port and into the pit without any spillage onto the de-heading deck. Fifth, the system is designed and constructed in a way to ensure long term operation without clogging or being operationally obstructed by coke particles, chunks, resid, or any other foreign matter. Sixth, the system is designed to be able to demonstrate, with absolute certainty, at all times and at all local and remote locations that it is positively isolating. Seventh, the system is virtually maintenance free except for long term parts replacement during scheduled shutdowns. Eighth, the system is capable of incorporating diagnostic capabilities that allow real time assessment and trending of the condition of sealing components during normal operations, in order to facilitate planned maintenance. Ninth, the system is easy to install as compared with other systems, and is field serviceable. Tenth, the system is cost competitive with existing technology, yet significantly outperforms this technology in virtually every aspect.

In some embodiments of the invention, there is no exposure to coke drum contents, whether onto the de-heading deck or to personnel, anywhere or at anytime during the coke drum de-heading process, or during any automated, manual, or inadvertent operation of the device at any time during a switching cycle. Some embodiments of the system comprise s a simply hydraulic design with one hydraulic power unit and one cylinder, and one supply and one return hydraulic line, therefore, there is less exposure to possible leaks during commissioning and startup as well as less opportunity for accidental or inappropriate normal operation. Further, some embodiments of the system comprise a positive mechanical lockout device in the form of a lockout pin that is incorporated for both open and closed positions. Still further, some embodiments of the invention comprise a compact hydraulic backup device to open and close the system, or is easily installed at the site, without exposing personnel. Still further in some embodiments of the invention, coke drum inlet feed line coupling and alignment devices are not required, therefore, there are no inlet line-coupling gaskets to replace or clean following each drum cycle, or exposure to personnel due to coupling misalignment and leakage.

Specifically regarding reliability, some embodiments of the system comprises a simple hydraulic design as described above. Some embodiments of the system also comprises one major moving part instead of multiple moving parts as found on existing devices and systems.

Specifically regarding economy, in some embodiments of the invention there are no head gaskets to replace after each drum cycle or after a failed coke drum pressure test. Furthermore, in some embodiments very little to no routine maintenance is required during normal operation. Still further, some embodiments of the system comprise a compact and basic operating control console that can be strategically located and installed with minimal effort and with all desired safety interlocks. Still further, some embodiments of the system comprise internal diagnostic capabilities that allow the operator to schedule maintenance to coincide with planned shutdown times. Still further, in some embodiments no water flushing of moving parts is required. Still further, in some embodiments the coke drum inlet feed line coupling and alignment devices are not required, thus there are no inlet line coupling gaskets to replace or clean after each cycle. Still further, in some embodiments minimum spare parts are required to be kept on hand, thus parts and storage costs can be reduced. Finally, in some embodiments the system can be configured to allow drainage of the drum water directly through the port.

Specifically regarding ease of operation and maintenance, only an open and closed function is required, there is no water flushing of moving parts required, there is no head gasket surface cleaning required, which in most cases is difficult to perform, and requires special tools, there are minimal spare parts required, and the operating system is strategically located and compact and easy to use.

Specifically regarding utility, the system is designed to be used on either the top or bottom ports of the coke drum.

All of the above is essentially accomplished using a specially designed de-header valve to be used in a de-header system. The deheader system specifically comprises a dual seated, linear motion, fully metal seated isolation device, or specifically, a fully enclosed, hydraulically powered, double sealed and pressurized linear goggle blind valve, or de-header valve. The deheader valve is removably coupled to and seals against the flanged portion of a coke drum much the same way a conventional head unit would be attached. The de-header valve is equipped with a sliding blind having an orifice therein, a flat surface adjacent the orifice, a stroke slightly greater than the diameter of the orifice in the de-header valve, and upper and lower seats, wherein one of such seats is a dynamic, live loaded seat that is capable of automatic adjustment so as to seal the blind between the upper and lower seats. As such, the sliding blind can be moved in a substantially linear bi-directional manner between upper and lower seats, or dual seats, thus causing the orifice located thereon to move between an open, closed, and partially open position relative to the orifice in the coke drum. In a closed position, the de-header valve and coke drum are prepared to receive the byproduct feed from the refinery process used to manufacture coke. Once the drum is full, the valve may be actuated causing the sliding blind to open. In doing so, coke that has accumulated on the blind is sheared by the upper and lower seats, thus de-heading the coke drum and facilitating the removal of coke using methods commonly known in the art. In essence, the de-header valve de-heads the coke drum and facilitates the removal of the coke from the coke drum upon actuation of the blind from a closed to an open position, wherein the coke is sheared.

In some embodiments the de-header valve has only one major moving part, the blind, which assures simplicity, reliability, and ease of maintenance. In some embodiments metal seat surfaces, the body interior and all internal parts are fully protected and isolated from any process media in the fully open or fully closed positions. In some embodiments the materials used in the construction of all sealing parts are resistant to corrosion, and are designed for exceptionally high metal to metal cycle duty. The seals of the de-heading valve are designed to cleanly break the bond between the coke and the top surface of the blind at each stroke. The total thrust required for this action combined with the thrust required to overcome seating friction and inertia is accomplished by actuating the blind.

During the initial stages of coking, the surfaces of the blind will distort due to uneven heat distribution throughout the thickness of the plate. Thus, in order to compensate for thermal expansion and thermal distortion of the blind during heat up, the externally live loaded metal seals of the de-heading device in some embodiment of the invention are designed to articulate axially and transversely as well as conform to the camber of the sliding blind at maximum differential temperature. This unique capability, combined with a continuously pressurized body, ensures the integrity of the seal across the de-heading valve at all times during the switching cycle.

The significant advantage of the deheader valve is its ability to simplify and improve the decoking process by utilizing the sliding bind that moves back and forth between dual independent seats.

The deheader valve is more specifically described and illustrated in U.S. patent application Ser. No. 10/096,301, filed Mar. 11, 2002, and entitled, "Improved Coke Drum Bottom De-heading System," which is incorporated by reference herein in its entirety.

Present Invention Dynamic Deheader Valve Installation System

Having set forth the form and function of the deheader valve, as well as one intended system in which a deheader valve is utilized, what follows is a more detailed description of the present invention system as designed and intended to operate or function with a deheader valve. It should be noted that the present invention installation system is particularly suited for a deheader valve. However, any type of closure may be utilized with the installation system as described herein, such as a prior art header that bolts onto a pressure vessel, such as a coke drum. Despite this, and for ease of discussion, the following more detailed description will speak primarily to a deheader valve as it is utilized with the present invention installation system, although it is not intended that the present invention be limited in any way only to being utilized with a deheader valve.

Figure 2:
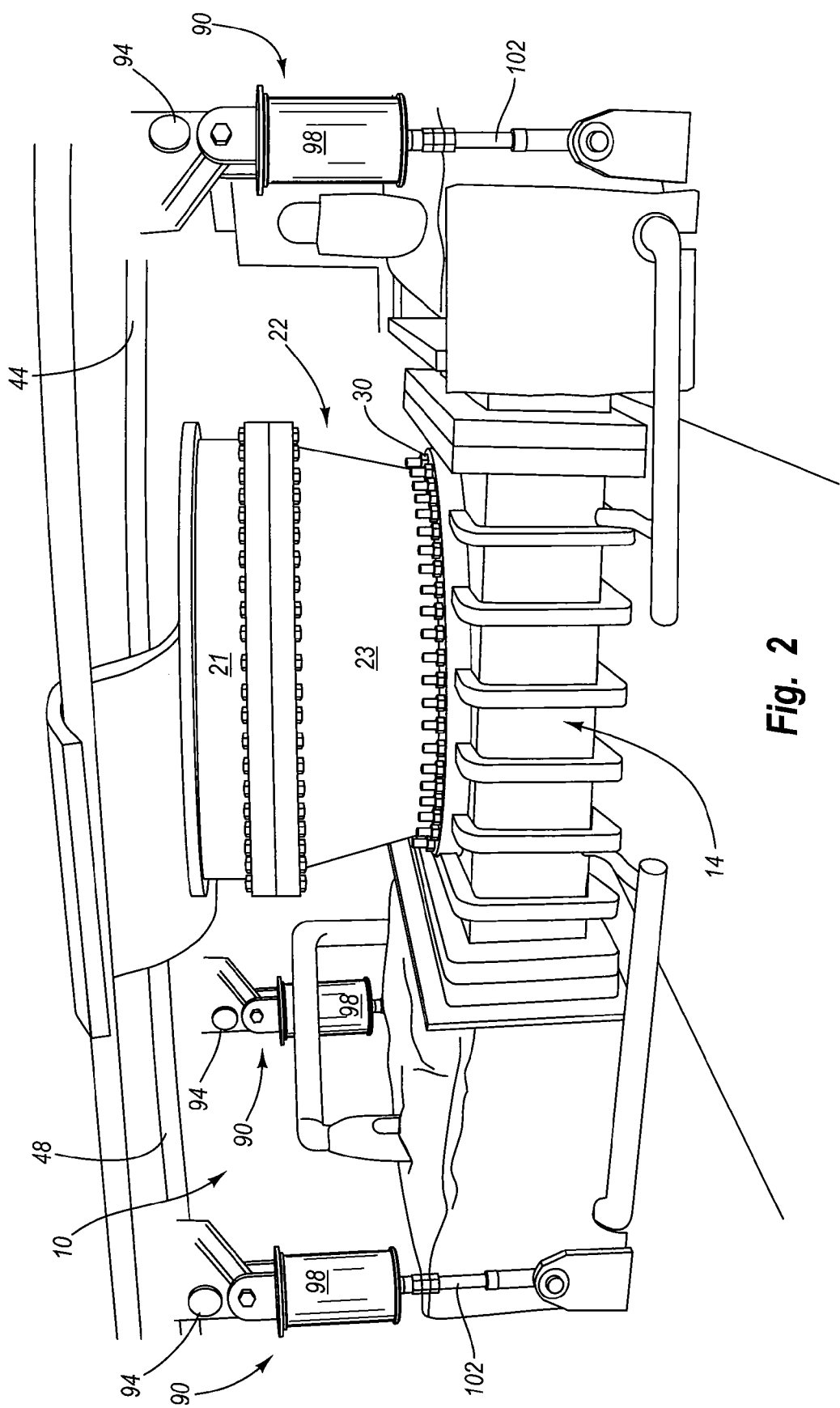
FIG. 2 illustrates a perspective view of the valve installation system illustrated in FIG. 1.

With reference to FIGS. 1 and 2, shown is dynamic deheader valve installation system 10 (hereinafter installation system 10). Installation system 10 comprises various means for supporting and facilitating the manipulation of a deheader valve 14 for and during installation purposes onto a pressure vessel 22, shown in FIGS. 1-3 as a combination coke drum 21 and transitioning spool 23, as well as for and during removal of deheader valve 14 from pressure vessel 22, such as for maintenance purposes when deheader valve 14 is required to be separated and decoupled from pressure vessel 22.

Generally, some embodiments of the installation system 10 comprises means for continuously supporting deheader valve 14 during installation onto and removal from pressure vessel 22; means for vertically positioning deheader valve 14 to enable and ensure parallel alignment with pressure vessel 22; and means for horizontally positioning deheader valve 14 along means for supporting deheader valve 14 to enable and ensure concentric alignment of deheader valve 14 with pressure vessel 22. Some embodiments of the installation system further comprises fixed support structure 40 constructed proximate pressure vessel 22, wherein fixed support structure 40 functions to support each of the aforementioned means to comprise a complete dynamic deheader valve installation system or assembly.

A preferred embodiment of the fixed support structure 40 is shown in FIGS. 1 and 2 as comprising a secure construction that is proximate pressure vessel 20. One of the purposes of fixed support structure 40 is to support the other components within installation system 10 and to allow them to perform their intended functions, namely facilitating the manipulation or movement of deheader valve 14 with respect to or relative pressure vessel 22. As shown, a preferred embodiment of a fixed support structure 40 is constructed around pressure vessel 22 using a number of steel or otherwise reinforced girders, beams, rafters, struts, or similar supports. However, these are not so proximate pressure vessel 22 so as to interfere with the function of pressure vessel 22 or any other components within the system, in this case a delayed coking system. Some embodiments of fixed support structure 40 comprise two main girders. First girder 44 runs along one side of pressure vessel 22 in an offset tangential manner. Second girder 48 runs along the opposite side of pressure vessel 22 also in an offset tangential manner, and parallel to first girder 44. In this configuration, first and second girders 44 and 48 provide a track-like arrangement about pressure vessel 22, whereby the other components of installation system 10 may be supported.

Preferred embodiments of first and second girders 44 and 48 are shown in the illustrated exemplary embodiments as consisting of I-beams having webbing and flange portions or segments as commonly known in the art. However, the structural elements making up fixed support structure 40 may comprise any material having any shape or design capable of supporting the components of installation system 10 in the manner as discussed herein.

Figure 3:
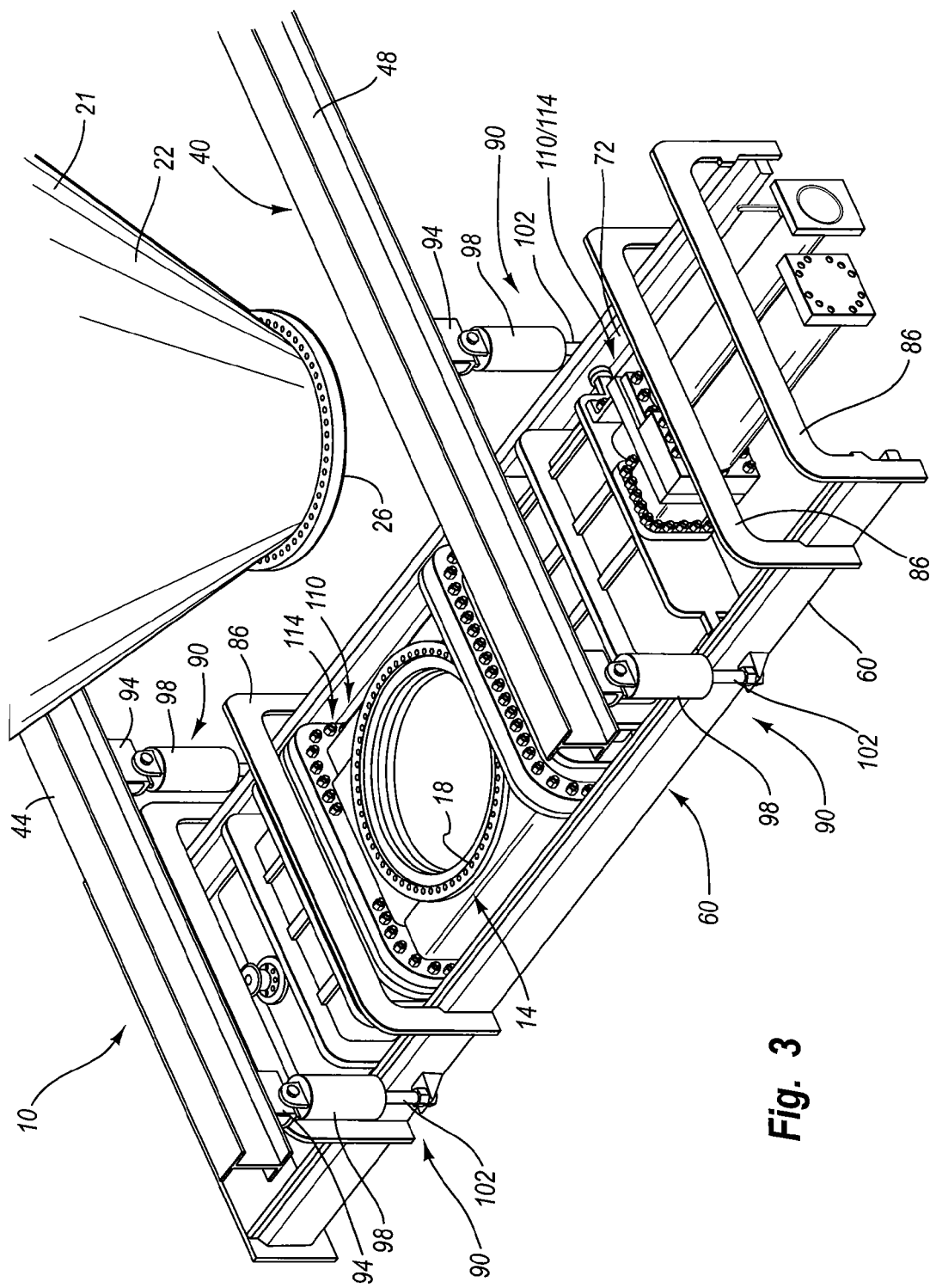
FIG. 3 illustrates an alternative exemplary embodiment of the valve installation system, specifically with the girders of the fixed support structure oriented perpendicular to the valve carriage.

First and second girders 44 and 48 may be oriented in any number of positions. FIGS. 1 and 2 illustrate an embodiment of girders 44 and 48 oriented such that deheader valve 14 is supported therefrom and moves in a horizontal, bi-directional manner longitudinally along fixed support structure 40 and first and second girders 44 and 48. FIG. 3 illustrates a different orientation. In FIG. 3, first and second girders 44 and 48 are oriented such that deheader valve 14 is supported therefrom and moves in a horizontal, bi-directional manner laterally along fixed support structure 40 and first and second girders 44 and 48. Other orientations may be possible as desired or dictated by system specifications or requirements and are contemplated herein, or are intended to fall within the scope of the present invention. As such, the particular orientations of girders 44 and 48, as well as the illustrated construction of fixed support structure 40, should not be construed as limiting in any way, but merely as exemplary.

In one exemplary embodiment, means for supporting deheader valve 14 comprises valve carriage 60 having first and second side rails 68 and 72 connected by a plurality of cross supports 86, thus giving valve carriage 60 a frame-like construction. In some embodiments of the invention, valve carriage 60 cradles deheader valve 14 therein, and also provides a mechanism to allow more precise adjustment or manipulation of deheader valve 14 once it is brought into the general proximity of pressure vessel 22. Moreover, in preferred embodiments of the invention, valve carriage 60 is the support vehicle for suspending deheader valve 14 from fixed support structure 40. In other words, deheader valve 14 is not directly suspended from fixed support structure 40, but indirectly suspended via valve carriage 60. As such, it is valve carriage 60 that is preferably suspended from fixed support structure 40 rather than the deheader valve itself, although the same function is achieved. Valve carriage 60 is suspended fixed support structure 40 via an elevation adjustment assembly 90, which is discussed in greater detail below. The arrangement or relationship of valve carriage 60 with deheader valve 14 provides both simultaneous movement of the two along fixed support structure 40, while still allowing independent movement between the two when required.

In preferred embodiments of the invention valve carriage 60 is designed to facilitate both approximate and precise vector positioning of deheader valve 14 with respect to pressure vessel 22. Approximate vector positioning is achieved by sliding valve carriage 60 along girders 44 and 48 of fixed support structure either toward or away from pressure vessel 22. Precise vector positioning is achieved by sliding deheader valve 14 within valve carriage 60 itself as allowed via horizontal transfer assembly 110, which is also discussed in greater detail below.

In another exemplary embodiment, means for supporting deheader valve 14 comprises the combination of fixed support structure 40 and valve carriage 60, wherein valve carriage 60 is dynamically coupled to fixed support structure 40 to allow horizontal transferring or adjusting of valve carriage 60 relative to fixed support structure 40, as well as to pressure vessel 22.

In another exemplary embodiment, installation system 14 further comprises means for vertically positioning deheader valve 14 to enable and ensure parallel alignment with pressure vessel 22. In one exemplary embodiment, means for vertically positioning deheader valve 14 comprises an elevation adjustment assembly 90 that dynamically and adjustably suspends valve carriage 60 from fixed support structure 40, and particularly girders 44 and 48, to allow valve carriage 60 to move or slide along girders 44 and 48 of fixed support structure 40 toward or away from pressure vessel 22. In some embodiments, elevation adjustment assembly 90 further facilitates selective height and tilt adjustment of deheader valve 14, meaning that any portion of deheader valve 14 may be raised or lowered as needed to achieve a proper parallel alignment of an opening on deheader valve 14 with a corresponding complimentary opening on pressure vessel 22. As such, elevation adjustment assembly may provide a dual purpose in that it not only provides horizontal manipulation or adjustment of valve carriage 60 and deheader valve 14 supported therein, but it also functions to enable vertical positioning and adjustment of valve carriage 60 and deheader valve 14 as needed when approaching pressure vessel 22 to ensure that the complimentary connecting components of deheader valve 14 and pressure vessel 22 (e.g. their complimentary flanged components) are properly parallel to one another prior to coupling the two together. Thus, elevation adjustment assembly 90 facilitates both approximate and precision or precise vector positioning of deheader valve 14 with respect to pressure vessel 22—approximate vector positioning by providing bi-directional horizontal movement of valve carriage 60 and deheader valve 14 toward and away from pressure vessel 22, and precision vector positioning by allowing the elevation or height of valve carriage 60 and deheader valve 14 to be manipulated or adjusted relative pressure vessel 22.

As defined herein, approximate vector positioning shall mean any manipulation or movement or adjusting of deheader valve using installation system 10 that isn't required to be precise or that isn't required for concentric and/or parallel alignment of an opening in deheader valve 14 with a complimentary opening in pressure vessel 22. As such, approximate vector positioning might include those manipulations or movements of valve carriage 60 and deheader valve 14 that are caused to be undertaken to bring each of these into the general vicinity of pressure vessel 22, wherein they may further undergo more precise guiding or manipulation to properly align the openings in deheader valve 14 and pressure vessel 22. Or, approximate vector positioning might include those movements or manipulations of valve carriage 60 and deheader valve 14 undertaken to move them away from pressure vessel 22 once deheader valve 14 is decoupled from pressure vessel 22. Furthermore, as defined herein, precise or precision vector positioning shall mean any manipulation or movement of deheader valve 14 using installation system 10 that is done for the specific purpose of aligning an opening in deheader valve 14 with a complimentary opening in pressure vessel 22, including both concentric and parallel alignment.

In the embodiment shown in FIGS. 1-4, installation system 10 comprises a plurality of elevation adjustment assemblies 90, located at each quadrant of valve carriage 60, that suspend valve carriage 60, and deheader valve 14, from fixed support structure 40 and allow for independent multi-vector vertical positioning of deheader valve 14. Positioning an elevation adjustment assembly at each quadrant more easily facilitates multi-vector vertical positioning or height adjustment of valve carriage 60 and deheader valve 14 as supported therein than if only one or two elevation adjustment assemblies were used, although such an arrangement is contemplated herein. By multi-vector vertical positioning it is meant that deheader valve 14 is allowed to be raised or lowered or also tilted as needed to ensure parallel alignment of an opening in deheader valve 14 with an opening in pressure vessel 22 via flanged members 18 and 26, respectively, prior to connection of these together via connection means 30.

A preferred embodiment of a elevation adjustment assembly 90 comprises a roller assembly 94, a biasing member 98, and adjustment means 102. Roller assembly 94 is an attachment comprising rollers that slidably couples to fixed support structure 40, and particularly to girders 44 and 48, to facilitate movement of valve carriage 60 along fixed support structure as described above. The particular design of roller assembly 94 may vary, with each design capable of allowing horizontal manipulation of valve carriage 14 and deheader valve 14 about fixed support structure 40. Attached to roller assembly 94 is biasing member 98. Biasing member 98 comprises, in one exemplary embodiment, a spring loaded device having a spring therein that comprises a spring factor capable of supporting the weight of valve carriage 60 and deheader valve 14, while also allowing or accommodating slight vertical movement within valve carriage 60. Attached to the other end of biasing member 98 is adjustment means 102, which also further attaches to valve carriage 60. Adjustment means 102 preferably comprises a rod having at least one threaded end for attaching either to biasing member 98 or valve carriage 60. Providing threads on the rod allows it to be rotated with respect to biasing member 98 or valve carriage 60 or both, thus allowing vertical positioning or height adjustment of valve carriage 60 and deheader valve 14 relative fixed support structure 40 and pressure vessel 22.

Adjustment assembly 102 may comprise other designs or devices or systems to enable vertical positioning of deheader valve 14 as will be recognized by and apparent to one ordinarily skilled in the art. In preferred embodiments of the invention, the function of adjustment means 102 is to facilitate vertical positioning or height adjustment of valve carriage assembly and ultimately deheader valve 14 with respect to pressure vessel 22.

Some embodiments of the installation system 14 further comprises means for horizontally positioning deheader valve 14 along means for supporting deheader valve 14 to enable and ensure concentric alignment of deheader valve 14 with pressure vessel 22. In one exemplary embodiment, means for horizontally positioning and adjusting deheader valve 14 comprises a horizontal transfer assembly 110 that allows deheader valve 14 to move or be adjusted bi-directionally within valve carriage 60.

Figure 4:
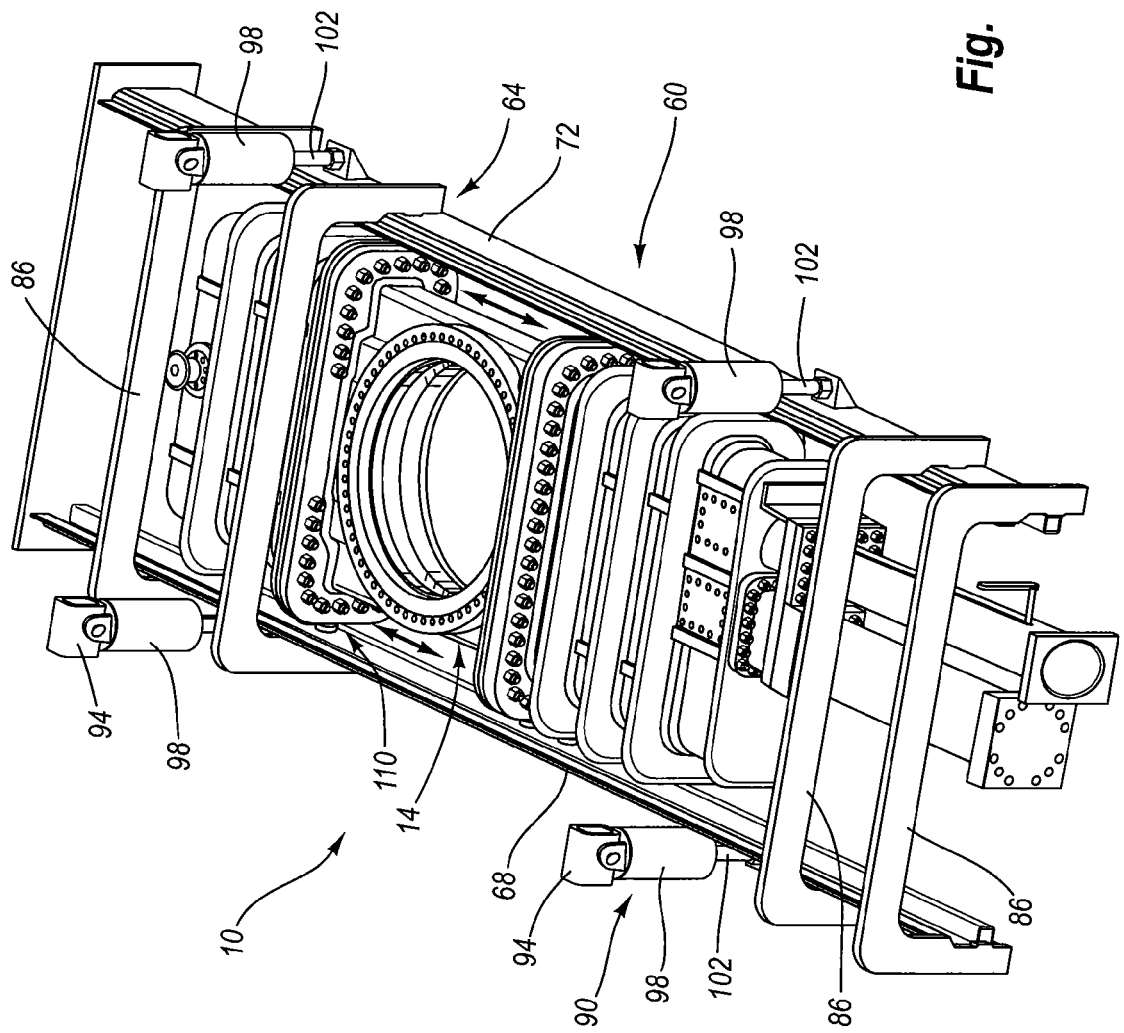
FIG. 4 illustrates a perspective view of one exemplary embodiment of the valve installation system.
Figure 5:
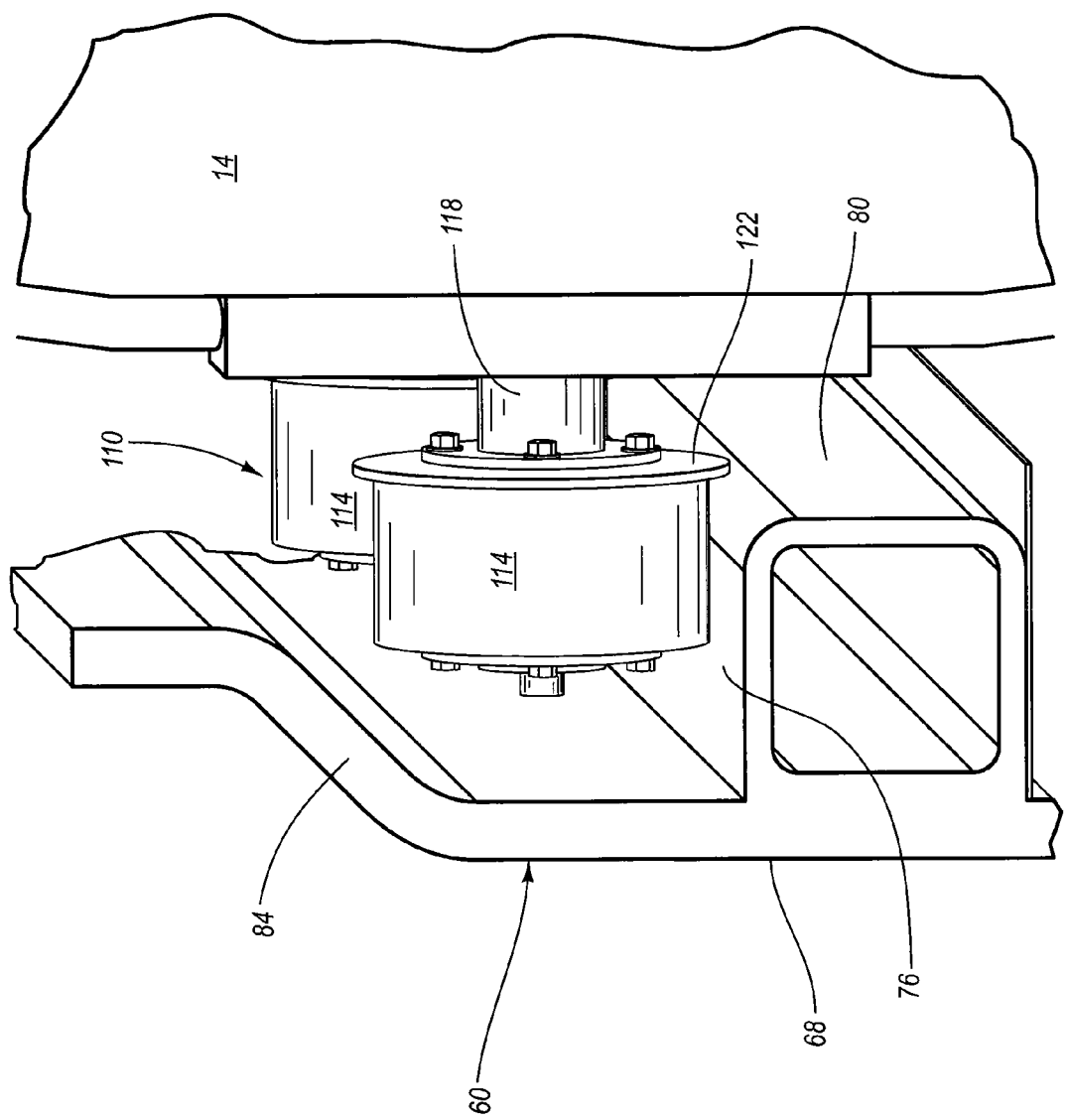
FIG. 5 illustrates a detailed view of the lateral adjustment assembly according to one exemplary embodiment of the present invention.

With reference to FIGS. 4 and 5, and particularly FIG. 5, shown is horizontal transfer assembly 110. Horizontal transfer assembly 110 comprises a plurality of rollers 114 attached along each side of deheader valve 14 via axles 118. Axles 118 are fixed to deheader valve 14, but allow rollers 114 to roll along upper surface 76 of first and second side rails 68 and 72. To help keep rollers 114 on track, each of rollers 114 comprise a flanged guide 122 that contacts a sidewall 80 of first and second side rails 68 and 72, thus maintaining a constant counteracting force between rollers on opposite sides of deheader valve 14. Although not necessary, side rails 68 and 72 further comprise a safety guide 84 to cover rollers 114 and prevent inadvertent access to rollers 114, thus reducing potential for injury.

As is indicated by the arrows, deheader valve 14 is capable of moving bi-directionally back and forth within valve carriage 60 to provide more precise vector positioning of deheader valve 14 with respect to a pressure vessel. As valve carriage 60, which contains deheader valve 14, is slid along fixed support structure 40 and brought within an approximate position under pressure vessel 22 (as illustrated in FIGS. 1-3), deheader valve 14 may further be manipulated in a horizontal, bi-directional manner using horizontal transfer assembly 110 to concentrically align an opening in deheader valve 14 with a corresponding complimentary opening in pressure vessel 22. This amounts to precision positioning of deheader valve 14 with respect to pressure vessel 22. A similar process is followed when removing deheader valve 14 from pressure vessel 22 and precision adjustment is called for.

With reference to FIG. 4, shown is a more detailed view of valve carriage 60, along with its relationship to deheader valve 14 as supported therein. Valve carriage 60 comprises first and second side rails 68 and 72, along with a plurality of cross supports 86 spanning between first and second side rails 68 and 72 to comprise frame 64. Cross supports 86 provide lateral support to valve carriage 60 and are strategically positioned to allow deheader valve 14 unobstructed access to pressure vessel 22. Other designs are contemplated that provide a carriage or cradle for a deheader valve and that facilitate suspending a deheader valve from the fixed support structure, or that generally support a deheader valve to provide precision vector positioning of the deheader valve therein.

Each of the above described means, as well as fixed support structure 40, work together in harmony to provide continuous, supported, multi-vector manipulation of deheader valve 14 with respect to pressure vessel 22 to enable parallel and concentric alignment of an opening in deheader valve 14 with a complimentary opening in pressure vessel 22. In other words, deheader valve 14 may be caused to move in any direction or attain any point or position with respect to pressure vessel 22 while continuously being supported, wherein such positioning or manipulation or directional movement is only limited by the physical constraints inherent within installation system 10 and its component parts or sub-systems.

Embodiments of the system as described herein are particularly useful in a delayed coking system where each component within the delayed coking system is very large, thus making them extremely bulky and heavy. The present invention provides advantages over other means of installing and removing closures, such as headers or deheader valves, because much of the manual labor and awkward machinery of prior art designs is eliminated. The present invention makes the process of installing and removing the closure much more simple and less error prone, which results in a much safer and much more efficient delayed coking process. The advantages specifically recited herein are not intended to be limiting in any way. Indeed, other advantages not specifically recited or recognized herein will be apparent to one of ordinary skill in the art and are meant to be within the scope of the invention as disclosed and claimed herein.

The present invention further features a method for providing continued support of a closure, and particularly a deheader valve, during installation onto and removal from a pressure vessel. The method comprises the steps of: obtaining a deheader valve to be installed onto a pressure vessel, wherein the deheader valve comprises a flanged opening that connects and seals with a corresponding flanged opening on the pressure vessel; causing the deheader valve to be dynamically supported within a valve carriage; equipping the valve carriage with a horizontal transfer assembly that couples to the deheader valve and that also slidably couples to the valve carriage to provide horizontal positioning of the deheader valve relative the valve carriage; coupling, dynamically, the valve carriage to a fixed support structure proximate the pressure vessel using an elevation adjustment assembly, wherein the elevation adjustment assembly enables independent, multiple-point vertical positioning and adjustment of the valve carriage and the deheader valve relative the fixed support structure and the pressure vessel; manipulating the deheader valve using each of the valve carriage, the elevation assembly, and the horizontal transfer assembly to obtain and maintain a concentric, parallel relationship between the flanged openings of the deheader valve and the pressure vessel; and coupling the deheader valve to the pressure vessel using one or more connection and sealing means upon proper positioning.

In one process, the step of manipulating discussed above comprises sliding the valve carriage along the fixed support structure to initially concentrically align the flanged opening of the deheader valve with the flanged opening of the pressure vessel. In another process, the step of manipulating comprises sliding the deheader valve along the valve carriage to further concentrically align the flanged opening of the deheader valve with the flanged opening of the pressure vessel. In still another process, the step of manipulating comprises vertically positioning, selectively, the deheader valve using the elevation adjustment assembly until the flanged opening of the deheader valve is parallel to and contacts the flanged opening of the pressure vessel.

The method described above further comprises the steps of decoupling the deheader valve from the pressure vessel; lowering the deheader valve from the pressure vessel by lowering the valve carriage via the elevation adjustment assembly; sliding the deheader valve along the valve carriage away from the pressure vessel; and sliding the valve carriage along the fixed support structure.

In one exemplary embodiment, the elevation adjustment assembly comprises at least two biased adjustment assemblies coupled to opposing ends of the valve carriage, wherein the adjusting elements provide and facilitate or enable independent, multiple-point vertical positioning and adjustment of the valve carriage and the deheader valve.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A dynamic deheader valve installation system comprising:

means for continuously supporting a deheader valve during installation onto and removal from a pressure vessel;

means for vertically positioning said deheader valve to enable and ensure parallel alignment with said pressure vessel; and means for horizontally positioning said deheader valve along said means for supporting a deheader valve.

2. The dynamic deheader valve installation system of claim 1, wherein said means for supporting a deheader valve comprises:

a fixed support structure; and a valve carriage dynamically coupled to said fixed support structure.

3. The dynamic deheader valve installation system of claim 1, wherein said means for supporting a deheader valve comprises a valve carriage having first and second side rails connected by a plurality of cross supports.

4. The dynamic deheader valve installation system of claim 3, wherein said cross supports are positioned to provide said deheader valve with unobstructed access to said pressure vessel.

5. The dynamic deheader valve installation system of claim 1, further comprising a fixed support structure that continuously and dynamically supports said means for supporting a deheader valve.

6. The dynamic deheader valve installation system of claim 1, wherein said means for horizontally positioning said deheader valve comprises:

a horizontal transfer assembly dynamically coupling said deheader valve and said means for supporting a deheader valve together, such that said horizontal transfer assembly facilitates bi-directional horizontal transitioning along said means for supporting a deheader valve to ensure concentric alignment of said deheader valve with said pressure vessel.

7. The dynamic deheader valve installation system of claim 6, wherein said horizontal transfer assembly comprises a roller system having a plurality of rollers slidably mounted onto said means for supporting a deheader valve and coupled to said deheader valve via respective axles, said roller system enabling said deheader valve to bi-directionally slide along said means for supporting a deheader valve.

8. The dynamic deheader valve installation system of claim 1, wherein means for horizontally positioning said deheader valve enables and ensures concentric alignment of said deheader valve with said pressure vessel.

9. The dynamic deheader valve installation system of claim 8, wherein each of said means work together to provide continuous, supported, multi-vector manipulation of said deheader valve.

10. The dynamic deheader valve installation system of claim 1, wherein said means for vertically positioning said deheader valve comprises an elevation assembly coupled to said means for supporting a deheader valve, said elevation assembly enabling independent, multiple-point height adjustment and alignment of said deheader valve with respect to said pressure vessel.

11. The dynamic deheader valve installation system of claim 10, wherein said elevation assembly comprises four springs located at each quadrant of said means for supporting a deheader valve.

12. The dynamic deheader valve installation system of claim 1, wherein said means for vertically and horizontally positioning said deheader valve further comprise powering means for automatically actuating these.

13. The dynamic deheader valve installation system of claim 1, wherein said pressure vessel comprises a coke drum.

14. The dynamic deheader valve installation system of claim 1, wherein said pressure vessel comprises a transition spool.

15. A dynamic deheader valve installation system comprising:
   a fixed support structure constructed proximate a pressure vessel;
   a valve carriage dynamically supported by said fixed support structure;
   an elevation adjustment assembly dynamically suspending said valve carriage from said fixed support structure; and
   a horizontal transfer assembly that dynamically couples said deheader valve to said valve carriage.

16. The dynamic deheader valve installation system of claim 15, wherein said valve carriage moves horizontally about said fixed support structure.

17. The dynamic deheader valve installation system of claim 15, wherein said valve carriage also dynamically and adjustably supports a deheader valve.

18. The dynamic deheader valve installation system of claim 17, wherein said valve carriage and said deheader valve move independent of one another.

19. The dynamic deheader valve installation system of claim 18, wherein said movement allows said valve carriage to move relative to said fixed support structure.

20. The dynamic deheader valve installation system of claim 15, wherein said elevation assembly enables vertical positioning and adjustment of said valve carriage and said deheader valve.

21. The dynamic deheader valve installation system of claim 15, wherein said horizontal transfer assembly enables horizontal bi-directional transitioning of said deheader valve relative to said valve carriage.

22. The dynamic deheader valve installation system of claim 15, wherein said elevation adjustment assembly and said horizontal transfer assembly provide both approximate and precision vector positioning of said deheader valve to enable parallel and concentric alignment of an opening in said deheader valve with a complimentary opening in said pressure vessel.

23. The dynamic deheader valve installation system of claim 15, wherein said valve carriage comprises first and second side rails connected by a plurality of cross supports.

24. The dynamic deheader valve installation system of claim 23, wherein said side rails and said cross supports are positioned to provide said deheader valve with unobstructed access to a pressure vessel for installation thereto.

25. The dynamic deheader valve installation system of claim 15, wherein said horizontal transfer assembly comprises a roller system having a plurality of rollers slidably mounted onto said side rails and coupled to said deheader valve via respective axles.

26. The dynamic deheader valve installation system of claim 25, wherein said roller system enables said deheader valve to bi-directionally slide along said side rails of said valve carriage, thus enabling precision vector positioning of said deheader valve.

27. The dynamic deheader valve installation system of claim 15, wherein said deheader valve slides back and forth along said valve carriage to attach to and detach from said pressure vessel during installation and maintenance procedures.

28. The dynamic deheader valve installation system of claim 15, wherein said dynamic deheader valve installation system comprises at least two elevation adjustment assemblies coupled at opposing ends of said valve carriage.

29. The dynamic deheader valve installation system of claim 28, wherein said adjustment assemblies providing independent, multi-vector vertical positioning and height adjustment of said valve carriage and said supported deheader valve.

30. The dynamic deheader valve installation system of claim 28, wherein said elevation adjustment assembly comprises an adjustment means coupled to a biasing element.

31. The dynamic deheader valve installation system of claim 15, wherein said fixed support structure comprises two girders oriented proximate said pressure vessel.

32. The dynamic deheader valve installation system of claim 31, wherein said elevation adjustment assembly slidably couples to said girders to facilitate horizontal, bi-directional manipulation and approximate vector positioning of said valve carriage with respect to said fixed support structure and said pressure vessel.

33. The dynamic deheader valve installation system of claim 31, wherein said girders are comprised of steel I-beams.

34. The dynamic deheader valve installation system of claim 31, wherein said elevation adjustment assembly comprises:
   at least one roller assembly slidably coupling said valve carriage to said girders, said roller assembly slides along said girders relative to said pressure vessel; and
   adjustment means comprising an adjustable rod adjustably coupled to a biasing member and said valve carriage, said adjustment means adjustably coupling said at least one roller assembly to said valve carriage, wherein the vertical positioning of said valve carriage is adjusted via said adjustment means.

35. A delayed coking system comprising:
   a feed inlet for delivering residual byproduct to said delayed coking system;
   a pressure vessel for receiving said residual byproduct therein;
   a deheader valve removably coupled to said pressure vessel;
   a dynamic deheader valve installation system for supporting a deheader valve and enabling positioning of said deheader valve, said dynamic deheader valve installation system comprising:
      a fixed support structure constructed proximate said pressure vessel;
      a valve carriage dynamically supported by said fixed support structure;

an elevation adjustment assembly dynamically suspending said valve carriage from said fixed support structure; and a horizontal transfer assembly that dynamically couples said deheader valve to said valve carriage.

36. The delayed coking system of claim 35, wherein dynamic deheader valve installation system enables positioning of said deheader valve for installation onto and maintenance when decoupled from said pressure vessel.

37. The delayed coking system of claim 35, wherein said valve carriage also dynamically and adjustably supports a deheader valve, said valve carriage comprising first and second side rails connected by a plurality of cross supports.

38. The delayed coking system of claim 37, wherein wherein said side rails and said cross supports are positioned to provide said deheader valve with unobstructed access to said pressure vessel for installation thereto.

39. The delayed coking system of claim 35, wherein elevation assembly enables said valve carriage to move relative to said fixed support structure.

40. The delayed coking system of claim 39, wherein, said elevation assembly enables vertical positioning and adjustment of said valve carriage and said deheader valve.

41. The delayed coking system of claim 35, wherein said horizontal transfer assembly enables horizontal bi-directional transitioning of said deheader valve relative to said valve carriage.

42. The delayed coking system of claim 41, wherein said elevation adjustment assembly and said horizontal transfer assembly provide vector positioning of said deheader valve to enable parallel and concentric alignment of an opening in said deheader valve with a complimentary opening in said pressure vessel.

43. A method for providing continued support of a closure, and particularly a deheader valve, during installation onto and removal from a pressure vessel, said method comprising the steps of:

obtaining a deheader valve to be installed onto a pressure vessel;

causing said deheader valve to be dynamically supported within a valve carriage;

equipping said valve carriage with a horizontal transfer assembly that couples to said deheader valve and that also slidably couples to said valve carriage;

coupling, dynamically, said valve carriage to a fixed support structure proximate said pressure vessel using an elevation adjustment assembly;

manipulating said deheader valve using each of said valve carriage, said elevation assembly, and said horizontal transfer assembly to obtain and maintain a concentric, parallel relationship between said flanged openings of said deheader valve and said pressure vessel; and coupling said deheader valve to said pressure vessel using one or more connection and sealing means upon proper positioning.

44. The method of claim 43, wherein said deheader valve comprises a flanged opening that connects and seals with a corresponding flanged opening on said pressure vessel.

45. The method of claim 43, wherein said horizontal transfer assembly provides horizontal positioning of said deheader valve relative said valve carriage.

46. The method of claim 43, wherein said elevation adjustment assembly enables independent, multiple point vertical positioning and adjustment of said valve carriage and said deheader valve relative said fixed support structure and said pressure vessel.

47. The method of claim 43, wherein said step of manipulating comprises sliding said valve carriage along said fixed support structure to initially concentrically align said flanged opening of said deheader valve with said flanged opening of said pressure vessel.

48. The method of claim 43, wherein said step of manipulating comprises sliding said deheader valve along said valve carriage to further concentrically align said flanged opening of said deheader valve with said flanged opening of said pressure vessel.

49. The method of claim 43, wherein said step of manipulating comprises vertically positioning, selectively, said deheader valve using said elevation adjustment assembly until said flanged opening of said deheader valve is parallel to and contacts said flanged opening of said pressure vessel.

50. The method of claim 43, further comprising the steps of:

decoupling said deheader valve from said pressure vessel;

lowering said deheader valve from said pressure vessel by lowering said valve carriage via said elevation adjustment assembly;

sliding said deheader valve along said valve carriage away from said pressure vessel; and sliding said valve carriage along said fixed support structure.

51. The method of claim 43, wherein said elevation adjustment assembly comprises at least two biased adjustment assemblies coupled to opposing ends of said valve carriage, said adjusting elements providing independent, multiple-point vertical positioning and adjustment of said valve carriage and said deheader valve.

52. An installation system for installing and removing a closure from a pressure vessel, said installation system comprising:

a fixed support structure constructed proximate a pressure vessel;

a carriage dynamically supported by said fixed support structure, said carriage also dynamically and adjustably supporting a closure, said movement of said carriage and said closure are independent of one another;

an elevation adjustment assembly dynamically suspending said carriage from said fixed support structure to allow said carriage to move relative to said fixed support structure, said elevation assembly enabling vertical positioning and adjustment of said carriage and said closure; and a horizontal transfer assembly that dynamically couples said closure to said carriage, said horizontal transfer assembly enabling horizontal bi-directional transitioning of said closure relative to said carriage, said elevation adjustment assembly and said horizontal transfer assembly providing both approximate and precision vector positioning of said closure to enable parallel and concentric alignment with said pressure vessel.

53. The installation system of claim 52, wherein said closure is a header.

54. The installation system of claim 52, wherein said closure is a deheader valve.

* * * * *

UNITED STATES PATENT AND TRADEMARK OFFICE
CERTIFICATE OF CORRECTION

| | | |
|---|---|---|
| PATENT NO. | : 7,357,848 B2 | Page 1 of 1 |
| APPLICATION NO. | : 10/997034 | |
| DATED | : April 15, 2008 | |
| INVENTOR(S) | : Lah | |

It is certified that error appears in the above-identified patent and that said Letters Patent is hereby corrected as shown below:

Col. 1, line 56, "tired" should read --tried--

Signed and Sealed this

First Day of July, 2008

JON W. DUDAS
*Director of the United States Patent and Trademark Office*